(12) United States Patent
Chupp et al.

(10) Patent No.: US 6,382,632 B1
(45) Date of Patent: May 7, 2002

(54) REPOSITIONABLE BRUSH SEAL FOR TURBOMACHINERY

(75) Inventors: Raymond Edward Chupp, Glenville; Osman Saim Dinc, Troy, both of NY (US); Gayle Hobbs Goetze, Greenville, SC (US); John Augustus Halbohm, Esperance, NY (US); Kenneth Lorenzo Parks, Simpsonville; Hui Kuang, Greenville, both of SC (US); George Ernest Reluzco, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/788,716

(22) Filed: Feb. 21, 2001

(51) Int. Cl.$^7$ ............................................. F16J 15/447
(52) U.S. Cl. ...................................................... 277/355
(58) Field of Search ......................................... 277/355

(56) References Cited

U.S. PATENT DOCUMENTS

| | | | |
|---|---|---|---|
| 4,403,779 A | * | 9/1983 | Wilkinson .................... 277/355 |
| 5,066,024 A | * | 11/1991 | Reisinger et al. ............ 277/355 |
| 5,114,159 A | * | 5/1992 | Baird et al. ................... 277/355 |
| 5,316,318 A | * | 5/1994 | Veau ............................ 277/355 |
| 5,425,543 A | * | 6/1995 | Buckshaw et al. .............. 165/9 |
| 5,474,305 A | * | 12/1995 | Flower ........................ 277/355 |
| 5,630,590 A | * | 5/1997 | Bouchard et al. ............ 277/301 |
| 6,308,958 B1 | * | 10/2001 | Turnquist et al. ............ 277/347 |

* cited by examiner

*Primary Examiner*—Anthony Knight
*Assistant Examiner*—John L. Beres
(74) *Attorney, Agent, or Firm*—Donald S. Ingraham; Christian G. Cabou

(57) ABSTRACT

A brush seal assembly is radially and axially repositionable relative to stationary and rotating components. Shim packs whose thickness can be reduced by peeling adhesively attached foil layers from the shim packs are used to provide both axial and radial repositioning. In another form, a plurality of set screws may be threaded into a mounting member for the brush seal assembly to controllably space the brush seal from the rotating component. In a further form, an eccentric cam is rotated to reposition the brush seal assembly radially inwardly or outwardly with shim packs being used to reposition the brush seal in an axial direction.

18 Claims, 4 Drawing Sheets

REPOSITIONABLE BRUSH SEAL FOR TURBOMACHINERY

BACKGROUND OF THE INVENTION

This invention relates to a brush seal for sealing between two components, e.g., a stationary component and a fixed component and, more particularly, relates to a brush seal whose position can be changed in two perpendicular directions relative to the components, e.g., radial and axial directions relative to fixed and rotating components.

In turbomachinery, brush seals are typically installed in a fixed position on a stationary component. The turbomachinery comprises many individual components, such as wheels, buckets, nozzles, diaphragms, casings, bearings and the like, each with its own manufacturing tolerances. As a result, when clearances between stationary and rotating components are measured at final assembly, different and relatively large variations in clearances can be expected due to the accumulation of the component manufacturing tolerances. During operation of the turbomachinery, the clearances between the components may also change due to differences in thermal expansion and the effects of rotation. Brush seals must be designed to accommodate these variations in clearances and to prevent a "hard rub" condition wherein the brush seal backing plate contacts the rotating component. In applications in turbomachinery where the space allotted for the brush seal is very limited, it becomes very difficult, if not impossible, to accommodate all of the manufacturing tolerances and provide a sufficient clearance margin to avoid a hard rub with the current brush seal designs.

Brush seals are currently mounted within a stationary component, typically a diaphragm, or nested within a labyrinth seal, using a T-shaped or L-shaped slot to establish the axial and radial position of the brush seal. Typically, the seal is repositionable only to the extent the position of the component carrying the brush seal, e.g., a diaphragm, is likewise repositionable. The position of the brush seal with respect to the carrier component is conventionally not repositionable. Accordingly, there is a need for a brush seal assembly which enables the position of the brush seal to be changed relative to its carrier component.

BRIEF SUMMARY OF THE INVENTION

In a preferred embodiment of the invention, a brush seal assembly is provided wherein the position of the brush seal can be changed relative to the carrier component in at least one direction and preferably in two directions generally perpendicular to one another. The brush seal typically includes a pair of backing plates and elongated bristles disposed between the backing plates and terminating in bristle tips spaced from margins of the backing plates for engagement with the rotating component. It is desirable to be able to reposition the brush seal in both axial and radial directions relative to the rotating component. To accomplish this, an annular or arcuately segmented brush seal is provided with a mounting member receivable within an axially opening slot or groove formed on the stationary component. By forming the slot or groove to a length exceeding the length of the mounting member and with the mounting member extending normal to the plane of the brush seal, the brush seal may be repositioned axially into the desired position. To change the position of the brush seal in a radial direction relative to the stationary and rotating member, shims are deployed on opposite sides of the mounting member and between the walls of the slot or groove. By varying the thicknesses of the shims between the brush seal and the slot or groove, the radial location of the brush seal is changed relative to the shaft. To fix the brush seal in the new position, two or more pins or screws may be used to secure the brush seal to the stationary component. In this embodiment, as well as other embodiments hereof, the seal may be repositioned in this manner as part of an original equipment manufacture or during a retrofit of the seal into the turbomachinery. Thus the turbomachinery may be delivered to an installation site with the stationary component having pre-drilled, undersized holes and the brush seal provided without pre-drilled holes. The final location of the holes on the brush seal is determined based on measurements at assembly. Pins or screws also provide an anti-rotation feature which prevents the brush seal from being displaced circumferentially relative to the fixed component.

In another preferred embodiment of the invention, set screws are employed to change the position of the mounting member relative to the stationary component in a radial direction. Once the desired radial position is obtained, the screws can be staked to the brush seal to prevent further rotation, thus fixing the position of the brush seal. The axial position of the brush seal is repositioned by inserting a laminated shim pack into the slot or groove of the fixed component. This laminated shim pack may be formed of individual foils, for example, 0.004 inches thick, joined by an adhesive. By removing layers of the foil from the shim pack, the axial position of the brush seal relative to the fixed component can be accurately determined.

Brush seals are typically applied in turbomachinery in arcuate segments whereby a plurality of segments form a complete annulus about the rotating component. In a further preferred embodiment of the invention, each segment is provided with an eccentric cam rotatable about an axis. The segment includes a cam follower positioned so that rotation of the cam causes the segment to be displaced in a radial direction, thereby repositioning the brush seal relative to the two components. At least a pair of eccentric cams are utilized for repositioning each segment.

In a still further preferred embodiment of the invention, the brush seal radial and axial positions are set by shims. The brush seal segment is secured to the stationary or fixed component by radial socket head cap screws and retaining pins. The brush seal segment has slots machined to accept the socket head cap screws. Once the radial and axial position of the seal has been set, the cap screws can be tightened to secure the assembly. By tack-welding the screw heads to the brush seal, loosening of the screws is prevented. Additional strength to the assembly is provided by installing retaining pins through the mounting arm and fixed component.

In another preferred embodiment of the invention, a repositionable seal assembly is provided for sealing between first and second components. This assembly comprises a brush seal for securement to the first component and having a plurality of bristles disposed between a pair of backing plates, the bristles arranged in a common plane and projecting from between the plates to terminate in bristle tips for sealing engagement with the second component, a mounting member carrying the brush seal for securing the brush seal to the first component, at least one shim cooperable between the first component and the mounting member for repositioning the brush seal relative to the first component in one of first and second directions, respectively generally perpendicular and parallel to the plane, and at least one fastener for securing the brush seal to the first component in a new position.

In a further preferred embodiment of the invention, a seal assembly for a turbine comprises a first, generally annular component fixed against rotation, a second component rotatable about an axis, and a seal assembly between the first and second components including a brush seal carried by one of the first and second components. The brush seal includes a plurality of bristles carried by at least one mounting plate and projecting from the mounting plate to terminate in bristle tips for sealing engagement with another of the first and second components, and a mounting member for mounting the brush seal to one component. The seal assembly further includes at least one shim cooperable between one component and the mounting member to reposition the brush seal relative to one component in one of first and second directions, respectively generally perpendicular and parallel to the axis, and at least one fastener securing the brush seal and one component to one another in the new position.

DETAILED DESCRIPTION OF THE INVENTION

Figure 1:
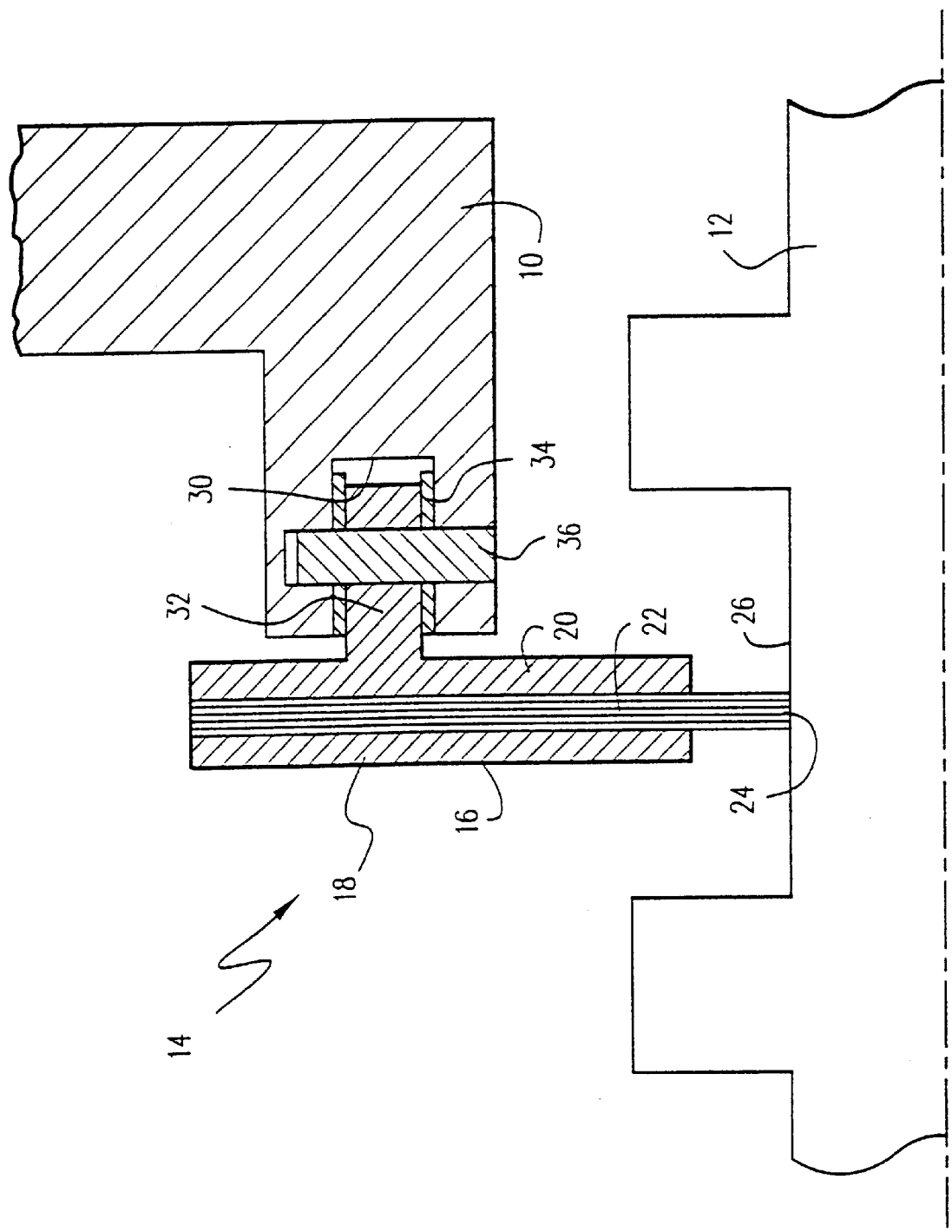
FIG. 1 is a fragmentary cross-sectional view of a segmented brush seal assembly in a finally changed position between stationary and rotary components in turbomachinery.

FIG. 1 illustrates a first fixed or stationary annular component, e.g., a diaphragm 10, in turbomachinery surrounding a second rotating component 12, e.g., a rotor, and a repositionable brush seal assembly, generally designated 14, for sealing between the first and second components 10 and 12, respectively. Brush seal assembly 14 includes a brush seal 16 having a pair of backing plates 18 and 20 and a plurality of bristles 22 extending between the backing plates. Bristles 22 are elongated, may be formed of a metal or ceramic material, and have tips 24 projecting from the radial margins of backing plates 16 and 20 into engagement with an opposing sealing surface 26 of rotor 12. Bristles 22 are disposed at a cant angle, preferably in the direction of rotation of the rotor, for example, a cant angle of approximately 30–40°. Where repositionable brush seal assembly 14 is used in turbomachinery as illustrated, brush seal 16 is provided in a plurality of arcuate segments arranged in end-to-end relation relative to one another to form a complete annulus about rotor 12.

Figure 4:
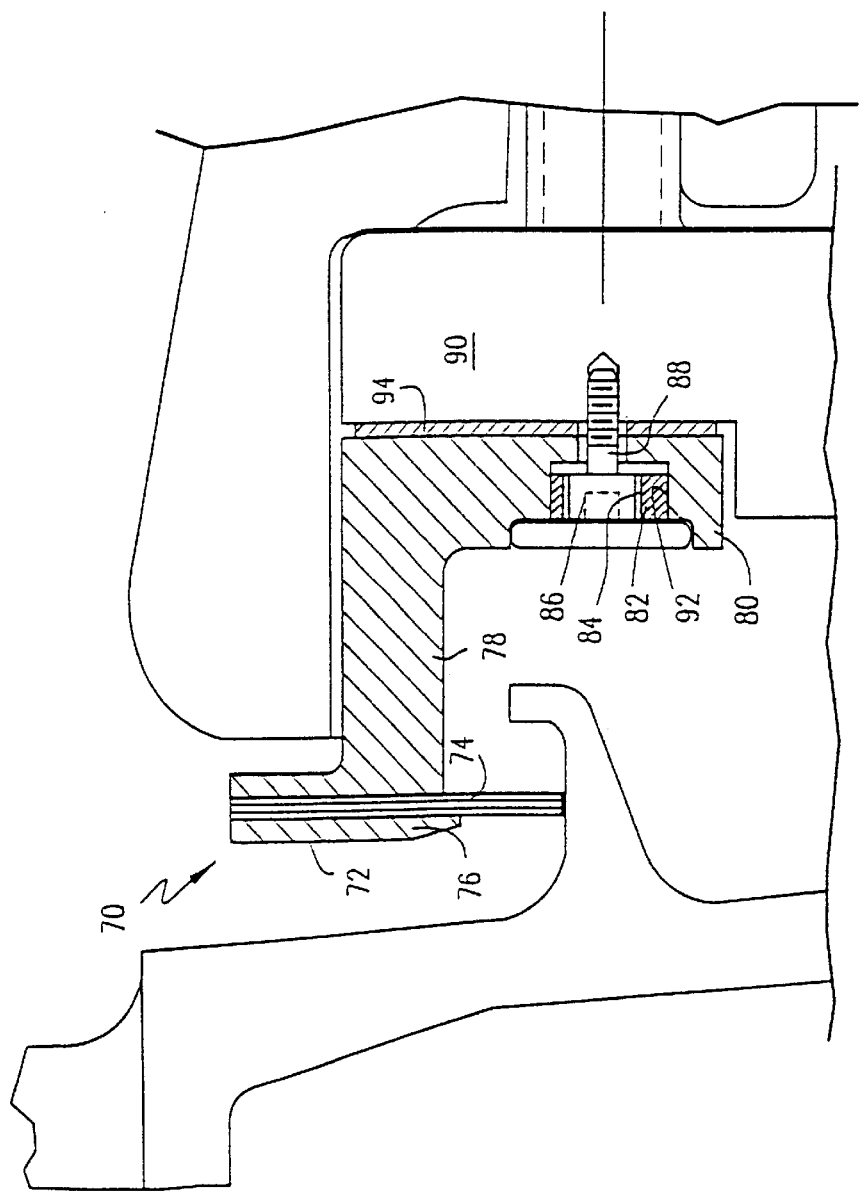
FIG. 4 is a view similar to FIG. 1 illustrating a further embodiment of a repositionable brush seal assembly according to the invention.

To reposition brush seal assembly 14 relative to both components in axial and radial directions, i.e., directions perpendicular to one another, fixed component 10 is provided with a slot or a groove 30 which, while illustrated as a channel with opposed sides and a base wall, may comprise a recess having only a pair of sides as shown in FIG. 4. To mount brush seal assembly 14 to fixed component 10, brush seal 16 includes a mounting member 32 which, in a preferred form, projects in an axial direction and conforms to the arcuate configuration of the brush seal and slot or groove 30. Consequently, by inserting mounting member 32 into slot or groove 30, the axial position of the brush seal can be altered relative to fixed component 10 until the desired axial dimension relative to rotor 12 is obtained. To reposition the radial position of brush seal 16, arcuate shims 34 are provided on opposite sides of mounting member 32. By varying the thickness of the shims between mounting member 32 and the side walls of slot or groove 30, the radial position of brush seal 16 relative to both components can be changed. Shims 34 may extend the full length of the arcuate segment or be provided in discrete arcuate lengths at discrete positions along slot or groove 30.

To fix brush seal 16 in the new position, fasteners, which may be in the form of pins or screws, such as pin 36, may be employed to secure mounting member 32 to fixed component 10. Two or more such fasteners may be used, depending upon the circumferential length of the arcuate seal segment.

The brush seal may be repositioned upon initial manufacture or as a retrofit. For example, as a retrofit, a diaphragm may be delivered to the installation site with pre-drilled and undersized holes. The brush seal may be provided without pre-drilled holes, with the final location of the holes for final securement of the brush seal to component 10 being determined based on measurements at the assembly site. Pins or screws 36 provide an anti-rotation feature which prevents the seal from circumferential displacement relative to fixed component 10.

Figure 3:
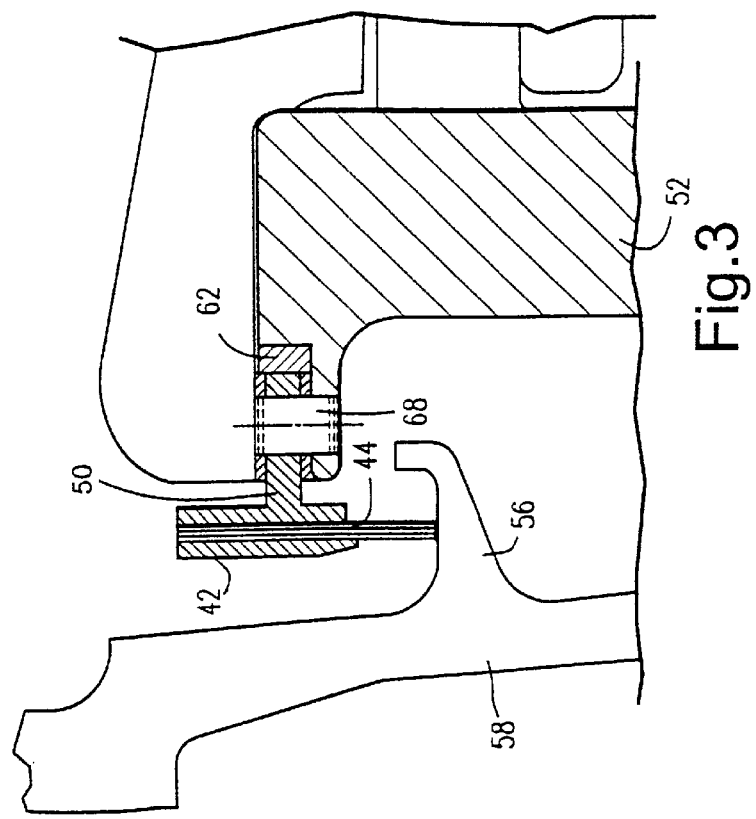
FIG. 3 is a view similar to FIG. 2 at a different circumferential location illustrating a pinned connection between the brush seal and the stationary component.
Figure 2:
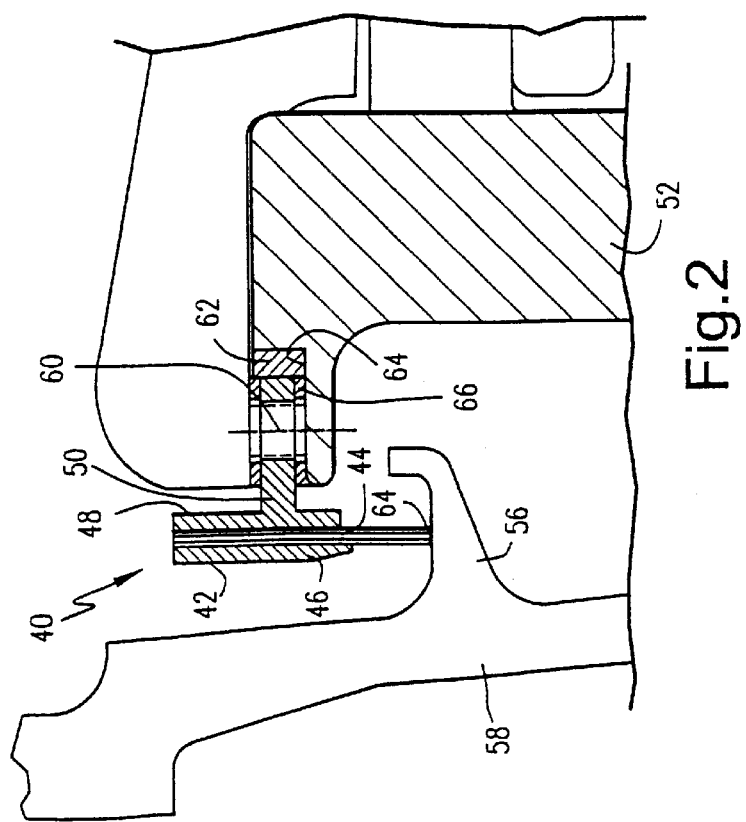
FIG. 2 is a view similar to FIG. 1 illustrating a further embodiment of a repositioned brush seal assembly according to one embodiment of the invention.

In the embodiment illustrated in FIGS. 2 and 3, a brush seal assembly, generally designated 40, includes a brush seal 42 having bristles 44 disposed between a pair of plates 46 and 48. The brush seal includes a mounting member 50 for supporting the brush seal from a fixed or stationary component 52 with the tips 54 of the brush seal engaging the wings 56 of a bucket 58. In this embodiment, the mounting member is provided with at least a pair of set screws 60 at circumferentially spaced positions about the seal segment and threaded to mounting member 50. By appropriately positioning the set screws, i.e., threading the set screws in mounting member 50, the radial position of the brush seal is set. The screws can then be staked to brush seal mounting member 50 to prevent further rotation. The axial position of the seal is repositioned by inserting an arcuate laminated foil shim pack 62 into the slot or groove 64. By removing adhesively attached foil layers of the shim pack, the thickness of the shim pack can be reduced to accurately locate the brush seal in the axial direction. Once the appropriate radial and axial positions of the brush seal have been identified, a second laminated shim pack 66 may be disposed between opposite sides of mounting member 50 and the sides of groove 64. As illustrated in FIG. 3, two or more radial pins 68 may be disposed in openings through stationary component 52 and mounting arm 50 to finally secure brush seal assembly 40 to stationary component 52.

Figure 5:
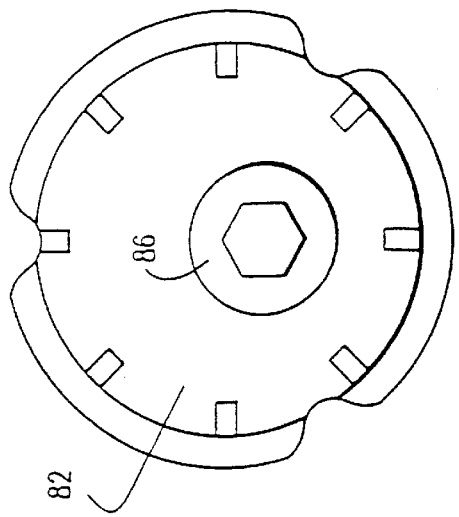
FIG. 5 is an enlarged front elevational view of an eccentric cam employed in the repositionable brush seal assembly of FIG. 4.

FIGS. 4 and 5 illustrate a further preferred embodiment of the brush seal assembly of the invention. The brush seal assembly, generally designated 70, includes a brush seal 72 having a plurality of bristles 74, as in the preceding embodiments, disposed between a backing plate 76 and the front face of an arcuate angle element 78 which includes a generally radially extending arcuate leg 80. At two or more locations along the circumferential extent of leg 80, eccentric cams 82 are provided. Each eccentric cam 82 has an off-center opening 84 which receives the head 86 of a connection 88 fastened to the stationary component 90 by, for example, screw threads. Each opening 92 in leg 80 serves as a cam follower for radially positioning brush seal 72. For example, by rotating eccentrically mounted cam 82 about the axis of head 86, which axis may be parallel to the rotor axis of rotation, the radial position of brush seal 72 is altered. Once the desired radial distance is obtained, cam 82 may be secured to leg 80 by, for example, peening along the surface of leg 80, as illustrated in FIG. 5. Axial positioning of brush seal 72 is accomplished as in the prior embodiments by locating a shim pack 94 between fixed component 90 and the back side of leg 80. By peeling from shim pack 94 an appropriate number of foil layers, the brush seal is located in the desired axial position.

Figure 7:
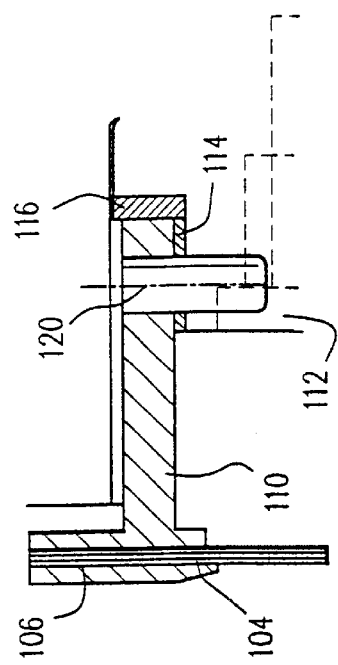
FIG. 7 is a view of the brush seal segment of FIG. 6 at a different circumferential location.
Figure 6:
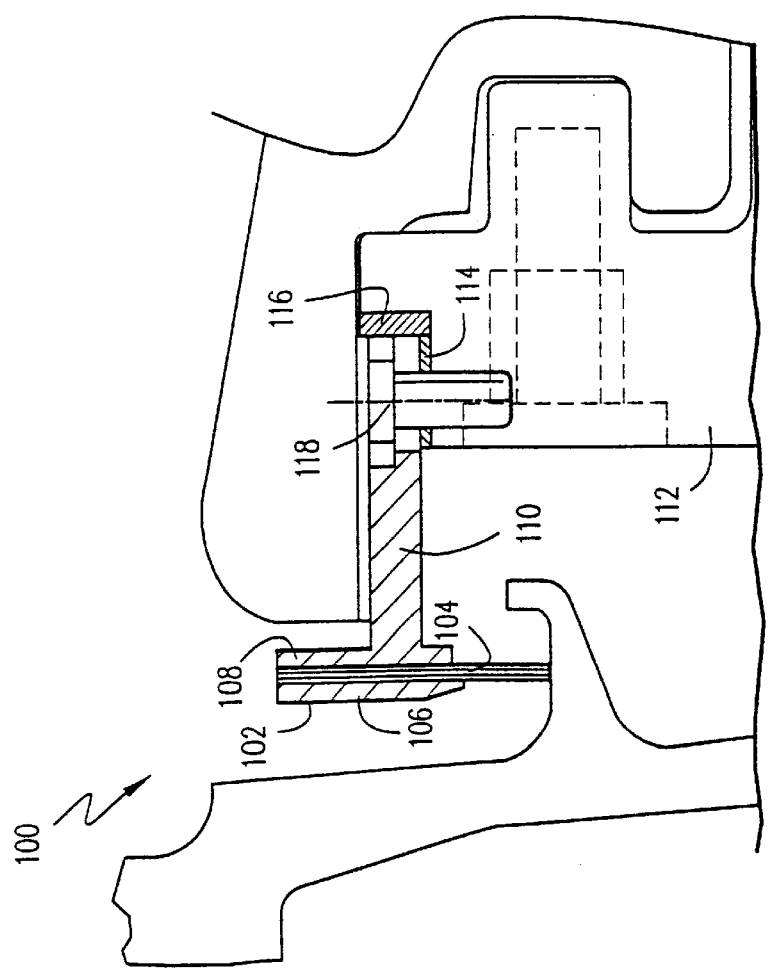
FIG. 6 is a view similar to FIG. 1 illustrating a further embodiment of the invention.

In FIGS. 6 and 7, a brush seal assembly, generally designated 100, includes a brush seal 102 having a plurality of bristles 104 as in the preceding embodiments, with backing plates 106 and 108 and a mounting member 110 for mounting brush seal assembly 100 on a stationary component 112. In this embodiment, the brush seal radial and axial positions are set by shims 114 and 116, respectively; that is, each of the shims may be reduced in size by peeling off layers of the shim until the new position of the brush seal assembly is obtained. Once obtained, the brush seal segment is secured to stationary component 112 by two or more radial socket head cap screws 118; that is, each brush seal segment has slots machined to accept the socket head cap screws and, once the new positions have been obtained, the cap screws can be tightened to secure the assembly in place. The heads of screws 118 can be tack-welded to the brush seal to prevent loosening. As illustrated in FIG. 7, retaining pins 120 may be installed to provide additional strength to the assembly. The retaining pin hole in mounting member 110 of the brush seal segment can be predrilled, while the retaining pin hole in the stationary component is drilled at the time of assembly. Thus this form of the invention enables a retrofit of the brush seal assembly in the field.

While the foregoing describes repositionable brush seals for sealing between components in turbomachinery, it will be appreciated that such brush seals are applicable to any sealing environment in which a brush seal is used and requires repositioning relative to one of the components, and are not necessarily applicable only to seals between stationary and rotary sealing components.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A repositionable seal assembly for sealing between first and second components, comprising:
   a brush seal for securement to the first component and having a plurality of bristles disposed between a pair of backing plates, said bristles arranged in a common plane and projecting from between said plates to terminate in bristle tips for sealing engagement with the second component;
   a mounting member carrying said brush seal for securing the brush seal to the first component;
   at least one shim cooperable between the first component and the mounting member for changing the position of the brush seal relative to the first component in one of first and second directions, respectively generally perpendicular and parallel to said plane; and
   at least one fastener for securing the brush seal to the first component in the changed position.

2. An assembly according to claim 1 wherein said at least one shim is disposed between the first component and the mounting member for changing the position of the brush seal in a direction parallel to said plane.

3. An assembly according to claim 1 wherein said at least one shim is disposed between the first component and said mounting member for changing the position of the brush seal in a direction perpendicular to said plane.

4. An assembly according to claim 1 wherein said at least one shim is disposed between the first component and the mounting member for changing the position of the brush seal in a direction parallel to said plane, and further comprising a second shim disposed between the first component and said mounting member for changing the position of the brush seal in a direction perpendicular to said plane.

5. An assembly according to claim 1 including an eccentric cam rotatable about an axis, said mounting member having a cam follower, said mounting member being positionable relative to the first component to change the position of the brush seal in another of said first and second directions in response to rotation of said eccentric cam about said axis.

6. An assembly according to claim 5 wherein said at least one shim positions the brush seal in said first direction and said eccentric cam positions the brush seal in said second direction.

7. A seal assembly for a turbine, comprising:
   a first, generally annular component fixed against rotation;
   a second component rotatable about a first axis;
   a seal assembly between said first and second components including a brush seal carried by one of said first and second components, said brush seal including a plurality of bristles carried by at least one mounting plate and projecting from said mounting plate to terminate in bristle tips for sealing engagement with another of said first and second components;
   said brush seal including a mounting member for mounting the brush seal to said one component;
   at least one shim cooperable between said one component and said mounting member for changing the position of said brush seal relative to said one component in one of first and second directions, respectively generally perpendicular and parallel to said first axis; and
   at least one fastener for securing said brush seal to said one component in the changed position.

8. An assembly according to claim 7 wherein said at least one shim is disposed between said one component and the mounting member for changing the position of the brush seal in a direction normal to said first axis.

9. An assembly according to claim 7 wherein said at least one shim is disposed between said one component and the mounting member for changing the position of the brush seal in a direction parallel to said first axis.

10. An assembly according to claim 7 wherein said at least one shim is disposed between said one component and the mounting member for changing the position of the brush seal in a direction normal to said first axis, and further comprising a second shim disposed between said one component and the mounting member for changing the position of the brush seal in a direction parallel to said first axis.

11. An assembly according to claim 7 wherein said brush seal comprises a plurality of arcuate segments arranged end-to-end forming an annular brush seal between said first and second components, and further comprising at least a pair of additional fasteners respectively, securing each brush seal segment and said one component to one another in the changed position.

12. An assembly according to claim 11 wherein said one component includes slots, said mounting member being received in said slots, each of said fasteners extending into a respective one of said slots and into said member.

13. An assembly according to claim 11 including an eccentric cam rotatable about a second axis, said mounting member having a cam follower, said mounting member being adjustable relative to said one component to change the position of the brush seal in another of said first and second directions in response to rotation of said eccentric cam about the second axis.

14. An assembly according to claim 13 wherein said shim positions the brush seal relative to said one component in a direction parallel to the first axis and said eccentric cam positions the brush seal relative to said one component in a direction normal to the first axis.

15. An assembly according to claim 11 including a pair of set screws threaded into said mounting member to change the position of the brush seal in a direction normal to the first axis.

16. An assembly according to claim 11 wherein said brush seal is carried by said first component and wherein said bristles projecting from said mounting plate terminate in said bristle tips for sealing engagement with said second component.

17. An assembly according to claim 13 wherein the first and second axes are parallel to each other.

18. An assembly according to claim 16 wherein the bristles of said brush seal are disposed at a cant angle in the direction of rotation of said second component.

* * * * *